United States Patent Office 3,836,476
Patented Sept. 17, 1974

---

3,836,476
SIMULTANEOUS RECOVERY OF VANADIUM AND URANIUM FROM OXIDIZED WET PROCESS ACID
Roger A. Baldwin, Oklahoma City, Paul D. Bowerman, Edmond, and Michael F. Lucid, Oklahoma City, Okla., assignors to Kerr-McGee Chemical Corp., Oklahoma City, Okla.
No Drawing. Filed Oct. 4, 1971, Ser. No. 186,418
Int. Cl. B01d 11/00; C01g 56/00
U.S. Cl. 252—301.1 R    9 Claims

ABSTRACT OF THE DISCLOSURE

A process for the simultaneous coextraction of uranium and vanadium from an aqueous acidic solution containing the same, comprising contacting said aqueous solution with an organic phase comprising a mixture of a dialkyl phosphoric acid, a trialkylphosphine oxide compound, and an organic diluent whereby the uranium and vanadium are coextracted into the organic phase and separating said uranium-vanadium loaded organic phase.

BACKGROUND OF THE INVENTION

Phosphoric acid is generally produced commercially by one of two methods. One method is generally called the "furnace" method, and the other is generally referred to as the "wet process" method. In the wet process method of producing phosphoric acid, phosphate rock is contacted with a mineral acid such as sulfuric acid. Most phosphate rock contains metal compounds in varying amounts. In many cases, these metal compounds are dissolved from the phosphate rock and appear in the wet process acid as contaminants. Vanadium and uranium compounds are among those dissolved from the phosphate rock, particularly when the rock is from the so-called western deposits of Idaho, Wyoming, Utah and Montana.

Vanadium, however, is an undesirable component of wet process phosphoric acid in that it prevents the use of the phosphoric acid in making animal feed supplements, as the amount of vanadium must be kept at a low level in such animal feed supplements. Similarly, uranium is undesirable in such feed supplements. Further, the removal of these uranium values from wet process phosphoric acid would prevent their release to the environment via the widespread usage of the fertilizer end products.

On the other hand, vanadium and uranium are valuable materials and wet process phosphoric acid can be an important source of these materials. Therefore, a process for the simultaneous recovery of vanadium and uranium from wet process phosphoric acid provides an important benefit, in that the vanadium and uranium are converted from undesirable contaminants to valuable by-products.

There have been many attempts made in the past to recover vanadium from wet process acid. One such process involves addition of a soluble ferrocyanide compound to the acid to precipitate the vanadium, as described more fully in U.S. Pat. No. 1,544,911. Other such processes involve extraction of the acid with an organic extractant for the vanadium. U.S. Pat. No. 2,211,119 describes a process in which the preferred organic extraction is isopropyl ether. U.S. Pat. No. 3,437,454 describes a process in which the preferred organic extraction is an alpha-hydroxy oxime. In U.S. 3,700,415, assigned to the same assignee as the present invention, there is described a process for extracting vanadium from wet process phosphoric acid utilizing certain neutral organophosphorus compounds as an extractant.

Further, there have been several processes developed for recovering uranium from wet process acids derived from eastern phosphate deposits. Typical of such uranium recovery processes are those disclosed in U.S. Pats. Nos. 2,859,094, 3,052,514 and 3,243,257 using, as an extractant, a mixture of a dialkyl phosphoric acid and a neutral organophosphorus compound. While these prior art processes have been successful to some extent, there is a need for a process for recovering both vanadium and uranium from acidic solutions.

SUMMARY OF THE INVENTION

It now has been discovered that an organic solvent comprising a mixture of a dialkyl phosphoric acid, a trialkylphosphine oxide compound and an organic diluent will coextract substantial quantities of uranium and vanadium from an aqueous acidic solution containing the same, provided that certain favorable ratios of dialkyl phosphoric acid to trialkylphosphine oxide compound are utilized.

Broadly, the present invention provides a process for the simultaneous coextraction of uranium and vanadium from acidic solutions. The aqueous acidic solution containing uranium and vanadium values is first treated with an oxidant to oxidize the uranium to the hexavalent oxidation state(VI) and the vanadium to the pentavalent oxidation state(V). The oxidized aqueous acidic solution is then contacted with an organic solvent comprising a mixture of a dialkyl phosphoric acid, a trialkylphosphine oxide compound and an organic diluent. The molar ratio of dialkyl phosphoric acid to trialkylphosphine oxide compound is within the range of from about 1 to 10 to 3 to 1, preferably in the range of 1:4 to 1:1. It has been found that by utilizing such ratios, substantial quantities of uranium and vanadium are coextracted into the organic phase. The loaded organic phase is subsequently separated from the aqueous phase. The uranium and vanadium may be stripped from the loaded organic phase with, for example, solutions of an aqueous base or reducing agents.

According to a preferred embodiment, the vanadium is preferentially stripped from the loaded organic phase utilizing a base such as, for example, sodium hydroxide, and controlling the addition of the stripping solution so that the equilibrium pH is about 5.5. Subsequently, the uranium can be stripped from the organic phase by an aqueous basic solution such as sodium carbonate or ammonium carbonate, for example.

DESCRIPTION OF A PREFERRED EMBODIMENT

In accordance with the present invention, a process is provided for the coextraction of uranium and vanadium from an aqueous acidic solution containing the same utilizing a solvent comprised of a trialkylphosphine oxide compound, a dialkyl phosphoric acid and an organic diluent.

The trialkylphosphine oxide compounds of this invention have the following general formula:

where R, R' and R" each are organic saturated hydrocarbon radicals containing from 4 to 14 carbons. Mixtures of compounds having the general formula as defined above also may be used.

Exemplary alkyl radicals of the above formula are the butyl, amyl, hexyl and octyl radicals.

In addition to the tertiary phosphine oxides, it is to be understood that within the scope of the claimed invention the corresponding oxonium salts are also contemplated. As examples of such oxonium salts may be mentioned tri - n - octylphosphinoxonium bisulfate, tri-n-octylphosphinoxonium phosphate and tri-n-butylphosphinoxonium nitrate. These salts are typically prepared by contacting an organic solution of a phosphine oxide with an aqueous solution of the appropriate acid.

According to a preferred embodiment of the present invention, the trialkylphosphine oxide compounds are those wherein R, R' and R'' are alkyl radicals of from 6 to 12 carbon atoms.

An especially preferred trialkylphosphine oxide compound according to the present invention is tri-$n$-octylphosphine oxide.

The dialkyl phosphoric acids applicable to the instant invention are represented by the general formula:

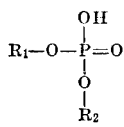

where $R_1$ and $R_2$ represent alkyl radicals and the total number of carbon atoms contained in the dialkyl phosphoric acid is at least 10. Examples of applicable alkyl groups include 2-ethylhexyl, $n$-octyl, pentyl, hexyl, heptyl, nonyl, dodecyl and the like.

A preferred group of dialkyl phosphoric acids are those containing from about 12 to 28 carbon atoms. Examples of such acids include di(2-ethylhexyl)-phosphoric acid, didodecylphosphoric and dioctylphosphoric acid.

In accordance with the present process, the trialkylphosphine oxide compound and the dialkyl phosphoric acid are dissolved in a water-immiscible organic diluent prior to contacting the same with the uranium and vanadium containing aqueous acidic solution. The term "water-immiscible organic diluent" as used therein refers to an organic material normally liquid at ambient temperatures which may be substantially, but not necessarily entirely, insoluble in water. The preferred organic diluents for the process of the present invention are the hydrocarbons. Examples of suitable hydrocarbon solvents include isooctane, kerosene, "Soltrol 170" (a commercially available isoparaffinic hydrocarbon solvent), Napoleum 470 (a commercially available hydrocarbon solvent) benzene, toluene, xylene, isodecane, fuel oils, mineral oils, hexane, heptane, octane, "Panasols" (a commercially available petroleum aromatic solvent), and the like. Solvents which contain functional groups can also be employed providing that the functional groups do not adversely affect the extraction. Particularly good results are obtainable when the organic diluent is a substantially nonreducing diluent as described in co-pending application Ser. No. 186,491 filed of even date herewith, now abandoned.

The amount of organic extractant phase to be used for most efficient extraction is from about 0.15 to 10 times the volume of acid solution to be treated. Particularly good results have been obtained with an organic to aqueous ratio of from about 0.5:1 to 1.5:1. The ratio of organic phase to aqueous acid phase to be used is dependent on the concentration of extractants in the organic phase, the temperature at which the extraction is performed, the contact time between the two phases and the amount of vanadium(V) in the acid solution. The concentration of trialkylphosphine oxide in the organic phase may range from 0.05 molar to 0.5 molar. An especially preferred range is from 0.1 to 0.3 molar. The amount of dialkyl phosphoric acid present in the organic phase may, of course, be determined based on the desired ratio of trialkylphosphine oxide compound to dialkyl phosphoric acid. The molar ratio of dialkyl phosphoric acid to trialkylphosphine oxide may vary from about 0.1:1 to about 2:1, the preferred range being 0.25:1 to about 1:1.

The process of the present invention is applicable to any aqueous acidic solution containing uranium and vanadium. The instant process is particularly applicable to wet process acid obtained from the western phosphate deposits which contain significant quantities of both uranium and vanadium.

It has been found in the practice of this invention that fluoride must be present in the phosphoric acid in order for the complexing agents of the present invention to properly complex the vanadium(V). Although the exact theory of the complex is not known, it is believed that the fluoride is complexed with vanadium(V) and the complexing agent. The amount of fluoride present in the mixture preferably is about 0.25 moles per mole of vanadium present, although a large excess of fluoride does not harm the extraction. Fluoride is a natural component of wet process phosphoric acid and therefore wet process phosphoric acid is particularly suited to the extraction process of the present invention.

Prior to contacting the aqueous acidic solution with the organic extractant mixture, the aqueous solution is treated, if necessary, with an oxidizing agent to make certain that the vanadium contained therein is in the pentavalent oxidation state(V) and the uranium is in the hexavalent oxidation state(VI). When the vanadium and uranium are not present as vanadium(V) and uranium(VI), the extraction process with the solvent extractants of the present invention is not satisfactory as vanadium and uranium in the lower oxidation states do not form a complex with the extractants contemplated in the scope of the invention.

The aqueous acidic solution may be oxidized by any known method such as, for example, with sodium chlorate, managanese dioxide, ozone, and the like. The oxidizer should be added in an amount sufficient to provide at least the stoichiometric requirements for oxidation of all the vanadium to vanadium(V) and uranium to uranium(VI). When there are other oxidizable species present in the aqueous acidic solution, such as are found in wet process acid, for example, it is desirable to provide an excess of the stoichiometric requirements of oxidizer. This being necessary, of course, to insure that substantially all the uranium and vanadium values present are oxidized.

The process of the present invention may be practiced within a temperature range of from about 20° C. to 80° C. with a temperature of about 30° C. to 60° C. being preferred.

It has been found that the contact time between the organic phase and the acid phase is an important variable to consider when extracting vanadium from acidic solutions. Longer contact times result in increased vanadium extraction. In practice, contact times of from about 1 minute to 60 minutes are satisfactory with about 5 minutes to 30 minutes per contact being especially preferred at temperatures of from about 30°–60° C. The extraction may be performed on a batch basis or a continuous basis, such as in a continuous countercurrent multi-stage extraction system.

In the process of the present invention, the organic phase is contacted with an aqueous acidic solution containing uranium and vanadium, at least a major portion of the vanadium and uranium values being in the pentavalent and hexavalent oxidation states respectively, whereby the uranium and vanadium are simultaneously coextracted in the organic phase. The loaded organic may be stripped by conventional methods; for example, the loaded organic phase may be contacted with an aqueous solution of sodium carbonate, ammonium carbonate or similar base at a pH above about 7 to simultaneously strip the vanadium and uranium values contained therein.

According to a preferred embodiment of the invention, the loaded organic is contacted with an aqueous sodium hydroxide, sodium carbonate or other suitable basic stripping solution. The addition of the stripping solution is carefully controlled so that equilibrium pH is not allowed to exceed about 6. It has been discovered that by such control of the equilibrium pH that vanadium is preferentially stripped from the loaded organic. Particularly good results have been obtained when the addition of a stripping solution is controlled such that the equilibrium pH is about 5.5. Under such conditions, substantially all the vanadium is stripped from the loaded organic whereas less than about 1 part per million of $U_3O_8$ is removed. Thus, stripping with an aqueous sodium hydroxide or similar solution at a controlled pH results in the preferential removal of only the vanadium values. The remaining uranium loaded organic can be processed by known methods for the subsequent removal of the uranium values. For example, the uranium loaded organic can be stripped with an aqueous solution of sodium carbonate, ammonium carbonate or similar base at a pH above about 7.

Suitable aqueous base strip solutions may contain any one of a number of alkali metal hydroxides, carbonates or mixtures thereof. Ammonium hydroxide can be used but is not as desirable for stripping vanadium as the alkali metal hydroxides or carbonates as it will also cause the formation of solid precipitates during the stripping process.

Stripping may be accomplished in a batch or continuous operation. A preferred method utilizes a multi-stage countercurrent stripping process.

The foregoing description and the following specific examples are for the purposes of illustration and are not to be considered as limiting the scope of the invention, reference being had to the appended claims for this purpose.

EXAMPLE I

This example demonstrates the effect of varying the molarity of the trialkylphosphine oxide compound and dialkyl phosphoric acid in the organic phase as well as the effect of varying the ratio of trialkylphosphine oxide compound to dialkyl phosphoric acid.

In a four-stage extraction process, four separatory funnels mounted in wrist shakers are utilized. The aqueous acidic solution is an oxidized wet process phosphoric acid (WPA) obtained from a western phosphate deposit and containing 1.31 grams per liter vanadium as $V_2O_5$ and 73 parts per million uranium as $U_3O_8$. The organic extractant phase is a kerosene diluent containing various quantities of tri-$n$-octylphosphine oxide (TOPO) and di(2-ethylhexyl)phosphoric acid (D2EHPA) as set forth in Table I below. Each of the separatory funnels contains a portion of the organic extractant solution and is contacted serially with the oxidized wet process phosphoric acid. The organic to aqueous ratio is maintained at 1 and the extractions are conducted at 50° C. with a 20 minute mix time per stage. After each extraction stage, a sample of the aqueous acidic raffinate solution is obtained and analyzed to determine the percent vanadium and uranium extracted. The results are recorded in Table I below.

TABLE I.—SIMULTANEOUS SERIAL EXTRACTION OF VANADIUM AND URANIUM FROM OXIDIZED WPA

| Molarity solvent composition | Extraction stage No. | Raffinate G./l. $V_2O_5$ | Raffinate P.p.m. $U_3O_8$ | Cumulative percent extracted $V_2O_5$ | Cumulative percent extracted $U_3O_8$ |
|---|---|---|---|---|---|
| 0.2 TOPO-0.1 D2EHPA | 1 | 0.44 | 62 | 66.4 | 15.1 |
|  | 2 | 0.30 | 45 | 77.1 | 38.4 |
|  | 3 | 0.25 | 31 | 80.9 | 57.5 |
|  | 4 | 0.22 | 23 | 82.4 | 68.5 |
| 0.2 TOPO-0.15 D2EHPA | ᵃ1 | 0.51 | 44 | 61.1 | 38.4 |
|  | 2 | 0.39 | 26 | 70.2 | 64.4 |
|  | 3 | 3.33 | 16 | 74.8 | 78.1 |
|  | 4 | 0.30 | 8 | 77.1 | 89.0 |
| 0.2 TOPO-0.2 D2EHPA | 1 | 0.72 | 29 | 43.5 | 60.3 |
|  | 2 | 0.51 | 14 | 61.1 | 80.8 |
|  | 3 | 0.44 | 4 | 66.4 | 94.5 |
|  | 4 | 0.38 | 1 | 71.0 | 98.6 |
| 0.2 TOPO-0.3 D2EHPA | 1 | 0.88 | 4 | 32.8 | 94.5 |
|  | 2 | 0.78 | 2 | 40.5 | 97.3 |
|  | 3 | 0.70 | 2 | 46.6 | 97.3 |
|  | 4 | 0.62 | 3 | 52.7 | 95.9 |
| 0.3 TOPO-0.15 D2EHPA | 1 | 0.36 | 47 | 72.5 | 35.6 |
|  | 2 | 0.26 | 28 | 80.2 | 61.6 |
|  | 3 | 0.25 | 18 | 80.9 | 75.3 |
|  | 4 | 0.24 | 9 | 81.7 | 87.7 |

ᵃ 35-minute mix time in this stage.

From the results recorded in Table I above, it will be seen that the optimum simultaneous coextraction of uranium and vanadium occurs when the molar ratio of dialkyl phosphoric acid to trialkylphosphine oxide is about 0.5. A substantial amount of coextraction occurs with ratios of up to 1.5. The exact concentration utilized depends on the concentration of vanadium and uranium in the solution to be processed and on the relative economic value of the two metals compared with the total costs of the recovery process.

EXAMPLE II

To demonstrate the preferential separation of vanadium from a vanadium-uranium loaded extractant, the following tests are conducted.

Samples of two organic extractants, each loaded with vanadium and uranium, are prepared. One of the samples is a 0.3M tri-$n$-octylphosphine oxide (TOPO)-0.15Mdi(2-ethylhexyl)phosphoric acid (D2EHPA) in kerosene loaded with 0.95 grams per liter $V_2O_5$ and 26 parts per million $U_3O_8$. The other sample of loaded extractant is a 0.2M TOPO-0.10M D2EHPA in kerosene loaded with 0.87 grams per liter $V_2O_5$ and 11 parts per million $U_3O_8$.

Each of the above samples is scrubbed with water. It has been found that an initial water scrub removes some of the impurities that are coextracted from WPA, such as phosphoric acid and hydrofluoric acid. The removal of such impurities reduces the amount of sodium carbonate or hydroxide required to strip the uranium and vanadium from the loaded extractant. Each of the samples of loaded organic extractant and an equal amount of water are placed in a separatory funnel mounted on a wrist action shaker and agitated for 5 minutes. Following the water scrub, a sample of the aqueous is obtained, analyzed and the results recorded in Table IIA below.

TABLE IIA.—WATER SCRUBBING OF VANADIUM AND URANIUM LOADED TOPO-D2EHPA EXTRACTANTS

| Extractant composition (in kerosene) | Water analyses after scrubbing of the loaded extractants | |
|---|---|---|
|  | G./l. $V_2O_5$ | P.p.m. $U_3O_8$ |
| 0.3M TOPO-0.15M D2EHPA | <0.01 | <1.0 |
| 0.2M TOPO-0.10M D2EHPA | <0.01 | <1.0 |

The results of the above tests and analysis clearly show that substantially no vanadium or uranium is removed during the water scrubbing.

Each of the water scrubbed extractants is preferentially stripped of vanadium utilizing the following general procedure. First, the water scrubbed loaded extractant is placed in a beaker equipped with a stirrer. A sufficient volume of an aqueous sodium hydroxide solution is slowly added to the beaker to provide an equilibrium pH of about 5.5. The contents of the beaker are then stirred for 10 minutes at room temperature, following which the aqueous strip solution is removed from the beaker. The aqueous strip solution and the stripped extractant are then analyzed and the results recorded in Table IIB below. In the second stage of stripping, that same stripped extractant is contacted with a fresh solution of sodium carbonate in an amount sufficient to provide an equilibrium pH of 5.5. The mixture is stirred for 10 minutes at 40° C., following which the aqueous strip solution is recovered. The strip solution and stripped extractant are analyzed and the results recorded. The results of these tests and analyses are set forth in Table IIB below.

TABLE IIB.—SELECTIVE STRIPPING OF VANADIUM FROM VANADIUM AND URANIUM LOADED TOPO-D2EHPA SOLVENTS

| Extractant composition (in kerosene) | Stage No. | Analysis of pregnant strip liquor | | Analysis of stripped extractant, G./l. V₂O₅ |
|---|---|---|---|---|
| | | G./l. V₂O₅ | P.p.m. U₃O₈ | |
| 0.3M TOPO–0.15M D2EHPA | 1 | 0.91 | <1.0 | 0.29 |
| | 2 | 0.30 | <1.0 | <0.03 |
| 0.2M TOPO–0.10M D2EHPA | 1 | 1.10 | <1.0 | 0.16 |
| | 2 | 0.17 | <1.0 | <0.03 |

The results clearly demonstrate that the vanadium is recovered substantially free of uranium, i.e., less than 1 p.p.m. uranium. The uranium is subsequently recovered from the vanadium stripped extractant by contacting it with a sufficient amount of an aqueous base solution to maintain the equilibrium pH above about 7.0.

What is claimed is:

1. A process for the simultaneous recovery of uranium-(VI) and vanadium(V) from a wet process phosphoric acid solution containing the same which comprises: contacting said solution in the presence of at least about 0.25 mole fluoride per mole vanadium with an organic extractant phase comprising a substantially water-immiscible organic diluent, a dialkyl phosphoric acid having the formula

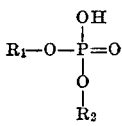

where $R_1$ and $R_2$ represent alkyl radicals and the total number of carbon atoms in the dialkyl phosphoric acid is at least 10 and a trialkylphosphine oxide having the formula

where R, R' and R'' are alkyl radicals, whereby the uranium and vanadium are preferentially coextracted into the organic phase and recovering the uranium and vanadium containing organic phase by stripping the uranium and vanadium from the organic phase with an aqueous basic solution; the dialkyl phosphoric acid and trialkylphosphine oxide being present in the organic extractant phase in an amount sufficient to provide a ratio of dialkyl phosphoric acid to trialkylphosphine oxide of from 1:4 to 1:1.

2. The process of claim 1 wherein the concentration of trialkylphosphine oxide in the organic phase is in the range of from 0.05 molar to 0.5 molar.

3. The process of claim 1 wherein the trialkylphosphine oxide is tri-$n$-octylphosphine oxide.

4. The process of claim 1 wherein the dialkyl phosphoric acid is di(2-ethylhexyl)phosphoric acid.

5. The process of claim 1 wherein the ratio of dialkyl phosphoric acid to trialkylphosphine oxide is about 0.5.

6. The process of claim 1 wherein the dialkyl phosphoric acid is di(2-ethylhexyl)phosphoric acid and the trialkylphosphine oxide is tri-$n$-octylphosphine oxide.

7. The process of claim 1 wherein the recovered organic phase is contacted with the aqueous basic solution in an amount sufficient to maintain the equilibrium pH at about 5.5, whereby the vanadium is preferentially stripped from the organic phase substantially free of uranium and recovering the resulting vanadium-barren uranium containing organic phase.

8. The process of claim 9 wherein the recovered uranium containing organic phase is contacted with an aqueous basic solution in an amount sufficient to maintain the equilibrium pH above about 7.0 whereby the uranium is stripped from the organic phase and recovering the uranium substantially free of vanadium.

9. The process of claim 1 wherein the trialkylphosphine oxide is tri-$n$-octylphosphine oxide present in amount sufficient to provide a concentration in the organic phase of from 0.1 to 0.3 molar and the dialkyl phosphoric acid is di(2-ethylhexyl)phosphoric acid.

References Cited

UNITED STATES PATENTS

| | | | |
|---|---|---|---|
| 3,243,257 | 3/1966 | Coleman | 23—341 |
| 2,859,094 | 11/1958 | Schmitt et al. | 23—341 |
| 3,214,239 | 10/1965 | Hazen et al. | 23—341 |
| 3,378,352 | 4/1968 | Hansen | 23—341 |
| 2,937,925 | 5/1960 | Blake et al. | 23—341 |

OTHER REFERENCES

Korkisch, J.: Modern Methods for the Separation of Rarer Metal, New York, Pergamon Press, 1969, pp. 836–47.

CARL D. QUARFORTH, Primary Examiner

R. L. TATE, Assistant Examiner

U.S. Cl. X.R.

23—312 P, 312 ME; 423—10, 63